United States Patent [19]

Martin, Jr.

[11] 4,115,614

[45] Sep. 19, 1978

[54] BONDING LAYERS FOR LINING ARTICLES WITH A CHLORINATED POLYETHYLENE MATERIAL

[75] Inventor: Theodore O. Martin, Jr., Wadsworth, Ohio

[73] Assignee: Chloeta F. Martin, Wadsworth, Ohio; a part interest

[21] Appl. No.: 791,563

[22] Filed: Apr. 27, 1977

[51] Int. Cl.² .................. B32B 31/00; B32B 15/18; B32B 17/06; B32B 25/14

[52] U.S. Cl. .................... 428/220; 428/466; 428/465; 428/495; 428/496; 428/516; 428/517; 428/518; 428/519

[58] Field of Search ............ 428/220, 466, 465, 495, 428/493, 515, 516, 517, 518, 519

[56] References Cited

U.S. PATENT DOCUMENTS

| | | | |
|---|---|---|---|
| 2,522,135 | 9/1950 | Schaffer | 428/466 |
| 3,179,554 | 4/1965 | Gladding et al. | 428/495 X |
| 3,489,642 | 1/1970 | Heuse | 428/517 X |
| 4,024,316 | 5/1977 | Loris | 428/465 |
| 4,038,449 | 7/1977 | Uemura et al. | 428/517 X |

*Primary Examiner*—P. C. Ives
*Attorney, Agent, or Firm*—Oldham, Oldham, Hudak & Weber Co.

[57] ABSTRACT

A duo bonding layer for adhering a chlorinated polyethylene layer or coating to a rubber-lined article. The first bonding layer contains a blend of material having from 75 to 25 percent of chlorinated polyethylene by weight and from 25 to 75 percent by weight of an elastomer of natural rubber, a rubber homopolymer, or a rubber copolymer. The second bonding layer contains a blend of the same material but with the amount of chlorinated polyethylene by weight ranging from 90 to 55 percent and the amount of the elastomer ranging from 10 to 45 percent by weight. The first bonding layer is generally attached to a rubber layer such as natural rubber, which in turn is bonded directly to an article. The second bonding layer is attached to the chlorinated polyethylene layer.

34 Claims, 3 Drawing Figures

BONDING LAYERS FOR LINING ARTICLES WITH A CHLORINATED POLYETHYLENE MATERIAL

BACKGROUND OF THE INVENTION

The present invention relates to the use of a specific duo bonding layer and to the adhesion of a chlorinated polyethylene polymer to an article.

Heretofore, pipes, tanks, reactors, and the like, especially in the chemical industry, have been coated with various materials to prevent corrosion, chemical attack, and so forth. A primary cause of corrosion or chemicl attack occurs through the handling of oxidizing agents such as acids. Thus, numerous coatings, paints, etc., have been developed which often times give suitable protection against the corrosion aspects of various chemical compounds. However, difficulties still exist with regard to properly coating various articles such as steel, aluminum, fiber glass, etc., with respect to various corrosion compounds such as phosphoric acid, hydrochloric acid, sulfuric acid, and various other compounds. A suitable protective coating is chlorinated polyethylene. However, it is very difficult to apply chlorinated polyethylene directly to steel, as well as aluminum or fiber glass. For example, an adhesive such as an epoxy resin cannot be utilized since it does not have enough tack, it requires a long curing time and thus, permits the chlorinated polyethylene polymer coating to fall off unless secured in some manner; and it possesses a short shelf life. Moreover, any resins simply do not act as an adhesive with regard to a metal such as steel, or with regard to the chlorinated polyethylene.

SUMMARY OF THE INVENTION

It is, therefore, an object of the present invention to provide a duo bonding layer for adhering a chlorinated polyethylene coating to various substrates.

It is another object of the present invention to provide a duo bonding layer for adhering a chlorinated polyethylene coating to said substrate, which duo layer is applied to said substrate via an intermediate rubber layer.

It is a further object of the present invention to provide a duo bonding layer, as above, wherein a first of the duo layers contains from 25 to 75 percent by weight of rubber and the second layer contains from 35 to 65 percent by weight of rubber, with the remaining amount being chlorinated polychloroethylene.

It is a still further object of the present invention to provide a composite layer for lining a substrate with chlorinated polyethylene through a duo bonding layer and an intermediate layer of rubber.

These and other objects of the present invention will become apparent from the following specification which describes in detail the embodiments without attempting to discuss all of the modifications in which the invention might be embodied.

In general, a duo bonding layer for adhering a chlorinated polyethylene to a rubber layer comprises, at least a first bonding layer containing a blend of a material, said blend having from 75 to 25 percent by weight of chlorinated polyethylene and from 25 to 75 percent by weight of an elastomer selected from the class consisting of natural rubber, a homopolymer, and a copolymer; said homopolymer made from monomers selected from the class consisting of dienes having from 4 to 12 carbon atoms, said copolymer made from monomers selected from the class consisting of dienes having from 4 to 17 carbon atoms and vinyl substituted aromatics having from 8 to 12 carbon atoms, and from various diene monomers having from 4 to 12 carbon atoms.

In general, a composite layer for lining a substrate with chlorinated polyethylene comprises, at least one layer of a rubber material bonded to an article, said rubber material selected from the class consisting of natural rubber, a homopolymer, and a copolymer, said homopolymer made from monomers selected from the class consisting of dienes having from 4 to 12 carbon atoms; said copolymer made from monomers selected from the class consisting of dienes having from 4 to 12 carbon atoms, and vinyl substituted aromatics having from 8 to 12 carbon atoms, and from various diene monomers having from 4 to 12 carbon atoms; a duo bonding layer as described immediately above bonded to said rubber layer, and a chlorinated polyethylene layer bonded to said duo layer.

DESCRIPTION OF THE PREFERRED EMBODIMENTS

Figure 1:
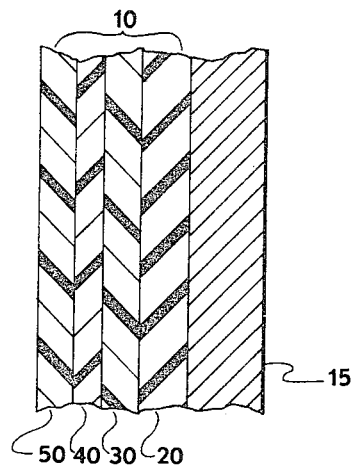
FIG. 1 is a cross-sectional view showing the chlorinated polyethylene attached through intermediate layers to an article.
Figure 2:
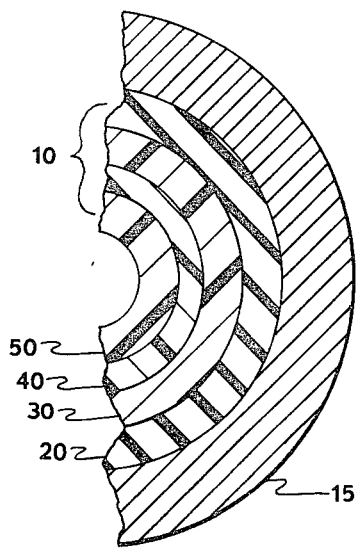
FIG. 2 is a cross-sectional view showing the chlorinated polyethylene attached through intermediate layers to a portion of a steel pipe.

According to the concepts of the present invention, chlorinated polyethylene is applied to a rubber-coated article through an intermediate duo layer of material. In the preferred embodiment as shown in FIGS. 1 and 2, a composite layer, generally indicated by the numeral 10, is applied to a substrate 15, such as conventional steel. A rubber layer 20 is bonded to the steel and two blend layers containing different amounts by weight of chlorinated polyethylene and an elastomer is then applied to rubber layer 20. The first or adjacent layer 30 has a lower percent of chlorinated polyethylene whereas the second layer of the duo layer material has a higher amount of chlorinated polyethylene. Finally, a layer of relatively pure chlorinated polyethylene is applied to the second layer 40. The chlorinated polyethylene, of course, has excellent corrosion and/or chemical resistance and thus, may be utilized in a great number of situations for lining tanks, pipes, and other equipment or articles which generally tend to corrode steel or degrade rubber.

Referring to FIG. 1, a cross-sectional view of a portion of a flat steel article such as a tank wall is coated in accordance with the present invention. Similarly, FIG. 2 shows the preferred embodiment utilized as a coating in a steel pipe or a tank. The thicknesses of the various layers have been exaggerated in order to clearly define the invention. Also, for convenience, the same identifying number has been utilized in each FIG. to identify the same layer. Thus, FIGS. 1 and 2 show a construction wherein chlorinated polyethylene, which is very difficult to apply either to steel or a rubber-coated article, is readily applied to either by applicant's invention.

Generally, the steel substrate 15 may be any type of steel and includes those commonly employed in the construction of tanks, pipes, equipment, and the like. Specific types of steel are too numerous to mention, however, examples include carbon steel such as mild carbon steel, low carbon steel, and the like, as well known to those skilled in the art. Additionally, the substrate may be any other type of material to which rubber can be made to adhere, such as aluminum, fiber glass, and the like. However, steel is the preferred substrate.

Rubber layer 20 may generally be of any type of elastomer. Thus, it may be natural rubber, that is cis-1,4-polyisoprene obtained from so called "rubber trees", various homopolymers made from diene monomers containing from 4 to 12 carbon atoms, various copolymers made from said monomers containing from 4 to 12 carbon atoms and from vinyl substituted aromatics containing from 8 to 12 carbon atoms, and from various combinations of the dienes. Natural rubber is a preferred compound. Specific examples of diene monomers include cis-1,3-polyisoprene (synthetic natural rubber), isoprene (that is, containing both cis and trans isomers), butadiene, piperylene, hexadiene, heptadiene, octadiene, decadiene, dodecadiene, 2,3-dimethyl-1,3-butadiene, 2-methyl-1,3-pentadiene, 3,4-dimethyl-1,3-hexadiene, 4,5-diethyl-1,3-octadiene, 3-butyl-1,3-octadiene, and the like. Preferred monomers include isoprene, cis-1,3-polyisoprene and butadiene. Another class of rubbers which can be utilized are various copolymers made from a diene having from 4 to 12 carbon atoms such as the copolymer of butadiene-isoprene, piperylene-isoprene, butadiene-hexadiene, and the like. Still another class of rubber compounds are the copolymers made from monomers of the dienes having from 4 to 12 carbon atoms with vinyl substituted aromatic compounds having from 8 to 12 carbon atoms. Examples of specific vinyl substituted aromatic monomers include styrene, alpha-methylstyrene, ortho-, para-, and meta-methyl,ethyl styrenes, and the like. Thus, specific examples of such copolymers include styrene-butadiene (SBR), styrene-isoprene, alpha-methylstyrene and butadiene, and the like. A preferred copolymer is styrene-butadiene. The number average molecular weight may range from about 10,000 to about 500,000 with a range of from 100,000 to about 400,000 being preferred.

The rubber is applied to the substrate in any conventional manner. For example, the substrate is usually roughed as by grit or sand blasting and the like and then cleaned in any conventional manner as by brushing. If substrate 10 is a metal such as steel or aluminum, a conventional metal primer is applied. Then, any conventional adhesive system is applied to the metal primer to bond rubber layer 20 to substrate 15. Generally, a rubber-based adhesive system may be utilized. The entire roughing procedure and the application of a resin to secure rubber layer 20 to the substrate is well known to those skilled in the art and hence, the application thereof or the use of various resins or metal primers does not form a part of the present invention.

Rubber layer 20 generally has a minimum thickness of 10 mills (that is, 0.010 inches) with a more desirable minimum coating being 30 mills. A preferred thickness is about 40 mills. The maximum thickness of rubber coating 20 may range up to ¼ inch, ½ inch, 1 inch, or the like, and is generally only limited by practical considerations such as cost or the thickness actually required to serve its purpose.

In actual practice, rubber layer 20 as well as duo blend layers 30 and 40 and the chlorinated polyethylene layer 50 are all generally prepared and adhered to each other in the order set forth in the drawings. The layers are then shipped to a specific manufacturer where the steel is prepared, as noted above, and rubber layer 20 is then adhered to the steel layer 15. The various layers are also cured at this time, although any of the layers may have been previously cured with rubber layer 20 being cured after application to the steel or other substrate.

Additionally, ruber layer 20, duo blend layers 30 and 40, as well as chlorinated polyethylene layer 50, may be compounded to improve their physical properties utilizing typical and well known compounding ingredients. Thus, carbon black, zinc oxide, silica, various clays, oils, waxes or fibers may be utilized along with a host of other compounds such as fillers, antioxidants, antiozonates, curing agents (both sulfur and peroxide), accelerators, processing agents, and the like, as well known and understood by those skilled in the art. The actual compounding may utilize conventional equipment such as conventional rubber mills, internal mixers, and the like. Preferably, rubber layer 20, as well as duo layers 30 and 40, and chlorinated polyethylene layer 50 all contain a curing agent such as a sulfur compound or an organic peroxide.

Considering the duo blend layers 30 and 40, they are identical except that, as previously noted, second layer 40 contains a higher amount of chlorinated polyethylene by weight percent. Blend layers 30 and 40 comprise a mixture of chlorinated polyethylene and an elastomer or rubber. The elastomer may be the same rubber utilized in rubber layer 20 and, hence, is selected from the class consisting of natural rubber, a homopolymer, and a copolymer as set forth above. Generally, the number average molecular weight range of the chlorinated polyethylene polymer will range from about 45,000 to about 150,000 with a more preferred range being from about 50,000 to about 100,000. The amount of chlorination, based upon the amount of chlorine by weight in the polymer, generally ranges from a minimum of about 25 to about 55 percent with a more desirable range being from about 30 to about 40 percent. The molecular weight of the rubber polymer can generally range from about 10,000 to about 500,000 with a more desirable range being from about 100,000 to about 400,000. The elastomer homopolymer is made from diene monomers containing from 4 to 12 carbon atoms whereas the copolymer may be made from combinations of dienes having from 4 to 12 carbon atoms with vinyl substituted aromatic monomers containing from 8 to 12 carbon atoms or from combinations of said diene monomers. Specific examples of various monomers are the same as set forth above with regard to rubber layer 20. Preferred elastomers include natural rubber, polybutadiene and polybutadienestyrene rubber.

Duo layer 30 contains a range of chlorinated polyethylene by weight of from 75 to about 25 percent based upon the weight of said chlorinated polyethylene and said rubber, with a preferred range being from about 65 to about 35 percent. Correspondingly, the amount of the rubber polymer in the blend may range from 25 to about 75 weight percent with the preferred range being from about 35 to 65 weight percent.

Although the blend layers 30 and 40 may contain various additives or compounding agents as noted above, the amount of rubber by weight in the blend is always, of course, with regard to the total weight of the rubber and chlorinated polyethylene. Similarly, the amount by weight of the chlorinated polyethylene is based solely upon the total weight of the rubber and chlorinated polyethylene.

As noted, duo layer 40 is identical to duo layer 30 except that the amount of chlorinated polyethylene contained in the blend is higher. Generally, the amount by weight of the chlorinated polyethylene can range from about 90 to about 55 percent with a preferred range being from about 85 to about 65 percent. The remaining percent is made up by the elastomer. The elastomer and the chlorinated polyethylene can be mixed or blended in any conventional manner utilizing any conventional equipment and the like.

The thickness of duo blend layers 30 and 40 may vary over a very wide range with only the minimum thickness being important since the maximum thickness may generally be any desirable thickness such as ½ inch, 1 inch, 2 inches, or the like. An absolute minimum thickness of blend layers 30 and 40 is approximately 10 mills with a more desirable minimum thickness being about 30 mills. A suitable thickness is about 40 mills.

Each of layers 30 and 40 desirably contain conventional compounding agents, as previously noted, such as carbon black and the like. Additionally, they also contain a conventional curing or vulcanizing agent so that upon curing, the layers contain vastly improved physical properties such as tensile strength, shear strength, and the like.

Layer 50 has a molecular range extending from about 45,000 to about 150,000 on a number average and preferably from about 50,000 to about 100,000. The amount of chlorine, on a weight percentage basis of the polymer, may be the same as used in duo layers 30 and 40, that is, of about 25 to about 55 percent with a preferred range of about 30 to about 40 percent. Chlorinated polyethylene layer 50 may be a typical or conventional chlorinated polyethylene polymer and may be made in any conventional manner or process. Its thickness may be preferably about 25 mills, desirably 30 mills, with a minimum thickness of about 10 mills. Of course, if desired, the thickness may range up to ½ inch, 1 inch, and the like. Additionally, it may contain any typical or conventional compounding agents utilized in the production and use of various conventional chlorinated polyethylenes. Thus, typical or usual compounding ingredients may be added and mixed with the chlorinated polyethylene such as carbon black, lead silicate, and the like, which generally are classified as fillers, antioxidants, antiozonates, curing agents (sulfur and peroxide), accelerators, processing agents, and the like. These compounding agents for the chlorinated polyethylene are well known to those skilled in the art and may be mixed with a chlorinated polyethylene in any conventional manner such as on a rubber mill, an internal mixer, or the like.

The above-described layers may be assembled in any manner such as adding outer blend layer 40 to chlorinated polyethylene layer 50, then adding inner blend layer 30 to blend layer 40, followed by adding rubber layer 20 to blend layer 30. Additionally, the blend layers 30 and 40 may first be added to each other with the remaining layers added thereto. Although the preferred embodiment comprises the four layers shown in FIGS. 1 and 2, of course, additional layers of any particular layer may also be utilized. The only requirement is that the rubber layer is backed by blend layers of increasing chlorinated polyethylene content and coated or covered by the virtually pure chlorinated polyethylene layer. This is essential since such an arrangement has been found to be readily applied to a steel article and results in excellent adhesion. Otherwise, and as is well known in the art, it is very difficult to apply a layer of chlorinated polyethylene to steel or to rubber-lined steel, even through the use of various adhesives such as epoxy resins. Moreover, the present invention is very versatile in that the four basic layers may be assembled or manufactured in a plant and then shipped to a factory or outside location for installation.

The various layers may be formed according to any conventional manner such as calendering, extruding, and the like. The layers are then merely assembled one upon the other due to the inherent tack of their uncured state and stay sufficiently adhered to one another during storage, shipment, or the like, prior to assembly. If desirable, the assembled layers may be calendered to assure adhesion to each other. The duo blend layers 30 amd 40, including a coating layer 50 and a rubber bonding layer 20, when either previously assembled or when assembled on an article, is applied to the article as described above with essentially the article being prepared through grinding, etching, and the like and then preped with a tie primer and a tie coat. The various layers, all of which contain curing agents, are then cured to produce a strong, tough layer assembly having good physical properties. The curing temperature will generally vary depending upon the type of specific curing agent utilized and, in general, range from approximately 190° to about 330° F with a more preferred range being from about 220° to about 280° F. Of course, the time of the cure will vary inversely with the cure temperature and may roughly vary from about ½ hour to about 3 hours or more. No special type of curing agent is required and as previously noted, typical or conventional curing agents are ideally suited. The curing may be carried out by simply applying atmospheric steam, that is steam under no pressure head. Of course, heated air may also be utilized.

Figure 3:
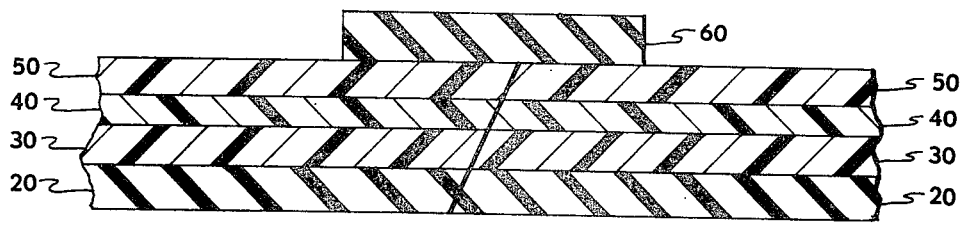
FIG. 3 is a cross-sectional view showing a patch covering two end portions of mating composite layers.

As shown in FIG. 3, whenever sections of the composite layer are butted together, preferably a skive butt seam is utilized with a chlorinated polyethylene cap strip, generally indicated by the numeral 60, covering the seam. Desirably, the butt joint is cut at an angle to insure more surface area contact.

The invention will be better understood by the following example.

EXAMPLE I

A rubber layer was made utilizing conventional compounds according to the following recipe.

| RUBBER RECIPE | |
|---|---|
| COMPOUND | PARTS |
| RSS (Ribbed Smoked Sheet - Natural Rubber) | 100.30 |
| N-(Cyclohexanethio)-Phthalimide | .20 |
| Zinc Oxide | 1.05 |
| Stearic Acid | .50 |
| Sulfur | 2.10 |
| TMTD - Tetramethylthiuramdisulfide | .12 |
| Agerite Resin D (Polymerized 1,2-Dihydro-2,2,4-Trimethylquinoline) | 1.05 |
| Circolite Oil (a naphthaline oil) | 1.85 |

The rubber compound was mixed on a mill for approximately 30 minutes at approximately 160° F and rolled into a sheet.

The duo blend layers were prepared as follows:

The first duo layer 20 was prepared on a mill by mixing for approximately 5 minutes at 150° F a rubber compound which contained 50 parts by weight of No. 1 Ribbed Smoked Sheet-Natural Rubber, along with 50 parts by weight of chlorinated polyethylene. As noted above, the natural rubber and the chlorinated polyethylene may contain various conventional compounds. In the specific embodiment made, the rubber portion of the rubber blend had the following recipe.

| RUBBER BLEND RECIPE | |
|---|---|
| COMPOUND | PARTS |
| RSS No. 1 (Ribbed Smoked Sheet No. 1 - Natural Rubber) | 100 |
| Percadox 29/40, manufactured by Noury Chemical Co., an organic peroxide curing agent | 7 |
| TAPA, an oil manufactured by Borg-Warner | 3 |
| P 133, distributed by Akron Chemical, a thermoplastic alkyl phenolic resin | 15 |

The chlorinated polyethylene utilized was exactly the same to the recipe set forth below and identified as "Chlorinated Polyethylene Recipe". Thus, the first duo layer 20 contained 50 parts by weight of a rubber blend made according to a recipe set forth immediately above and 50 parts of a chlorinated polyethylene made according to a recipe set forth below.

A second duo layer was formulated in the exact manner and from the same compounds as the first due layer except that the second layer contained 25 parts by weight of the compounded rubber as set forth in the recipe above entitled "Rubber Blend Recipe" and 75 parts by weight of a compounded chlorinated polyethylene made in accordance with the below set forth recipe entitled "Chlorinated Polyethylene Recipe".

The chlorinated polyethylene layer had a molecular weight of between 50,000 and 60,000 and contained approximately 36 percent by weight of chlorine and was compounded according to the following recipe:

| CHLORINATED POLYETHYLENE RECIPE | |
|---|---|
| COMPOUND | PARTS |
| XO5235.45, manufactured by Dow, a chlorinated polyethylene containing 36 percent by weight of chlorine and having a number average molecular weight of between 50,000 and 60,000 | 97.5 |
| K202D80, manufactured by Wyrough-Loser, 80 percent lead silicate and 20 percent chlorinated polyethylene resin | 12.5 |
| Sterling SO N550, manufactured by Cabot - carbon black | 30 |
| Sterling NS N774, manufactured by Cabot - carbon black | 40 |
| Dibutyl Phthalate | 30 |
| Percadox 29/40, an organic peroxide | 10 |
| TAPA, manufactured by Borg-Warner, an oil | 5 |

The Chlorinated Polyethylene Recipe was mixed on a Banbury utilizing a two pass system wherein the compounds were heated to approximately 330° for a minute or two and then cooled. A second heating period or pass was utilized wherein the temperature was approximately 220° F. During this second pass, Percadox 29/40, an organic peroxide curing agent, was added and milled for approximately 5 minutes.

The rubber sheet, the first blend layer, the second blend layer, and the chlorinated polyethylene layer were then all combined in the following manner. First, the rubber sheet and the first blend sheet were run through the mill together at approximately 150° F. This was sufficient to cause the layers to adhere to each other. In a similar manner, the rubber and first blend layer shape was then combined with the second blend layer and the resulting sheet then combined with the chlorinated polyethylene layer.

The composite sheet 10 was then cured at approximately 250°. The chlorinated polyethylene layer as well as the rubber layer could not be separated by hand. Additionally, these layers could not be separated by the use of pliers except for portions of the composite which were literally pulled out with complete disregard as to any layer boundary surfaces or the like.

While in accordance with the patent statutes, only the preferred embodiment has been illustrated and described in detail, many modifications of the invention may be made without departing from the spirit of the invention disclosed and described herein; the invention being measured solely by the following claims.

What is claimed is:

1. A duo bonding layer for adhering a chlorinated polyethylene to a rubber layer, comprising:
   at least a single first bonding layer containing a blend of a material, said blend by weight having from 75 to 25 percent of a chlorinated polyethylene and from 25 to 75 percent by weight of an elastomer selected from the class consisting of natural rubber, a homopolymer, and a copolymer,
   said homopolymer made from monomers selected from the class consisting of dienes having from 4 to 12 carbon atoms; said copolymer made from monomers selected from the class consisting of dienes having from 4 to 12 carbon atoms and vinyl substituted aromatic compounds having from 8 to 12 carbon atoms and from combinations of diene monomers having from 4 to 12 carbon atoms,
   at least a single second bonding layer containing a blend of the material, said blend having from 90 to 55 percent by weight of chlorinated polyethylene and from 10 to 45 percent by weight of an elastomer selected from the class consisting of natural rubber, a homopolymer, and a copolymer,
   said homopolymer made from monomers selected from the class consisting of dienes having from 4 to 12 carbon atoms; said copolymer made from monomers selected from the class consisting of dienes having from 4 to 12 carbon atoms and vinyl substituted aromatic compounds having from 8 to 12 carbon atoms, and from combinations of diene monomers having from 4 to 12 carbon atoms.

2. A duo bonding layer for adhering a chlorinated polyethylene to a rubber layer according to claim 1, wherein the amount of said chlorine by weight based upon said chlorinated polyethylene ranges from 25 to 55 percent.

3. A duo bonding layer for adhering a chlorinated polyethylene to a rubber layer according to claim 2, wherein said elastomer is selected from the class consisting of natural rubber, cis-1,3-polyisoprene, isoprene, polybutadiene, and a copolymer of butadiene and styrene.

4. A duo bonding layer for adhering a chlorinated polyethylene to a rubber layer according to claim 2, wherein the minimum thickness of both said first bonding layer and said second bonding layer is 10 mills.

5. A duo bonding layer for adhering a chlorinated polyethylene to a rubber layer according to claim 2, wherein said first bonding layer and said second bonding layer have been cured.

6. A duo bonding layer for adhering a chlorinated polyethylene to a rubber layer according to claim 2, wherein the amount of said chlorinated polyethylene by weight in said first bonding layer ranges from about 65 to about 35 percent, said elastomer in said blend ranges from 35 to about 65 percent, the amount of chlorinated polyethylene by weight in said second bonding layer blend ranges from about 90 to about 55 percent, the amount of said elastomer by weight in said blend ranges from about 10 to about 45 percent; said chlorinated polyethylene having a number average molecular weight of from about 45,000 to 150,000 and said elastomer is selected from the class consisting of natural rubber, a homopolymer, and a copolymer having a molecular weight of from about 10,000 to about 500,000.

7. A duo bonding layer for adhering a chlorinated polyethylene to a rubber layer according to claim 6, wherein said elastomer is selected from the class consisting of natural rubber, polybutadiene, and a copolymer of butadiene and styrene.

8. A duo bonding layer for adhering a chlorinated polyethylene to a rubber layer according to claim 7, wherein the molecular weight of said chlorinated polyethylene ranges from about 50,000 to about 100,000 and both said first bonding layer and said second bonding layer have a minimum thickness of 30 mills.

9. A duo bonding layer for adhering a chlorinated polyethylene to a rubber layer according to claim 6, wherein said first bonding layer and said second bonding layer have been cured.

10. A composite layer for lining a rubber-adherable substrate with chlorinated polyethylene, comprising:
at least one layer of a rubber material bonded to a rubber adherable substrate, said rubber material selected from the class consisting of natural rubber, a homopolymer, and a copolymer; said homopolymer made from monomers selected from the class consisting of dienes having from 4 to 12 carbon atoms; said copolymer made from monomers selected from the class consisting of dienes having from 4 to 12 carbon atoms and vinyl substituted aromatic compounds having from 8 to 12 carbon atoms, and combinations of diene monomers having from 4 to 12 carbon atoms;
at least one layer of a first bonding layer bonded to said rubber layer, said first bonding layer containing a blend having from 75 to 25 percent by weight of a chlorinated polyethylene and from 25 to 75 percent by weight of an elastomer selected from the class consisting of natural rubber, a homopolymer, and a copolymer; said homopolymer made from monomers selected from the class consisting of dienes having from 4 to 12 carbon atoms; said copolymer made from monomers selected from the class consisting of dienes having from 4 to 12 carbon atoms and vinyl substituted aromatic compounds having from 8 to 12 carbon atoms, and from combinations of diene monomers having from 4 to 12 carbon atoms;
at least one layer of a second bonding layer bonded to said first bonding layer, said second bonding layer containing a blend having from 90 to 55 percent by weight of a chlorinated polyethylene and from 10 to 45 percent by weight of an elastomer selected from the class consisting of natural rubber, a homopolymer, and a copolymer; said homopolymer made from monomers selected from the class consisting of dienes having from 4 to 12 carbon atoms; said copolymer made from monomers selected from the class consisting of dienes having from 4 to 12 carbon atoms and vinyl substituted aromatic compounds having from 8 to 12 carbon atoms, and from combinations of diene monomers having from 4 to 12 carbon atoms; and
at least one chlorinated polyethylene layer bonded to said second blend material.

11. A composite layer for lining a substrate with chlorinated polyethylene according to claim 10, wherein the amount of said chlorine by weight of said chlorinated polyethylene in both said first and said second blend layer, and said chlorinated polyethylene layer ranges from about 25 to about 55 percent.

12. A composite layer for lining a substrate with chlorinated polyethylene according to claim 11, wherein said rubber in said polymer layer is selected from the class consisting of natural rubber, cis-1,3-polyisoprene, polyisoprene, polybutadiene, and a copolymer of styrene and butadiene,
said elastomer in both said first and said second blend is selected from the class consisting of natural rubber, polybutadiene, and a copolymer of butadiene and styrene.

13. A composite layer for lining a substrate with chlorinated polyethylene according to claim 11, wherein said rubber layer has a minimum thickness of 10 mills, wherein both said first and said second blend layers have a minimum thickness of 10 mills, and wherein said chlorinated polyethylene layer has a minimum thickness of 10 mills.

14. A composite layer for lining a substrate with chlorinated polyethylene according to claim 11, wherein said rubber layer, both said first and said second blend layers, and said chlorinated polyethylene layers have been cured.

15. A composite layer for lining a substrate with chlorinated polyethylene according to claim 11, wherein the number average molecular weight of said chlorinated polyethylene polymer in both said first blend and said second blend ranges from about 45,000 to about 150,000; the number average molecular weight of said chlorinated polyethylene in said chlorinated polyethylene layer ranges from about 45,000 to about 150,000 percent by weight; the number average molecular weight of said elastomer in said elastomer layer ranges from about 10,000 to about 500,000; and the number average molecular weight of said elastomer in both said first and second blend layers ranges from about 10,000 to about 500,000.

16. A composite layer for lining a substrate with chlorinated polyethylene according to claim 11, wherein the amount of said chlorine by weight of said chlorinated polyethylene in both said first and said second blend layer ranges from about 30 to about 40 percent; the amount of chlorine by weight in said chlorinated polyethylene layer based upon the chlorinated polyethylene polymer ranges from about 30 to about 40 percent; the number average molecular weight of said chlorinated polyethylene polymers in both said first blend and said second blend ranges from about 50,000 to about 100,000; the number average molecular weight of said chlorinated polyethylene in said chlorinated polyethylene layer ranges from about 50,000 to about 100,000 by weight;
the number average molecular weight of said rubber in said rubber layer ranges from about 100,000 to about 400,000; and the number average molecular weight of said rubber polymer in both said first and second blend layers ranges from about 100,000 to about 400,000.

17. A composite layer for lining a substrate with chlorinated polyethylene according to claim 16, wherein said rubber in said polymer layer is selected from the class consisting of natural rubber, cis-1,3-polyisoprene, polyisoprene, polybutadiene, and a copolymer of styrene and butadiene;

said elastomer in both said first and said second blend is selected from the class consisting of natural rubber, polybutadiene, and a copolymer of butadiene and styrene.

18. A composite layer for lining a substrate with chlorinated polyethylene according to claim 16, wherein the minimum thickness of said rubber layer is 30 mills, the minimum thickness of both said first blend and said second blend layers is 30 mills, and the minimum thickness of said chlorinated polyethylene layer is 30 mills.

19. A composite layer for lining a substrate with chlorinated polyethylene according to claim 16, wherein said rubber layer, both said first and said second blend layers, and said chlorinated polyethylene layers have been cured.

20. A composite layer for lining a substrate according to claim 10, wherein said substrate is steel.

21. A composite layer for lining a substrate according to claim 12, wherein said substrate is steel.

22. A composite layer for lining a substrate according to claim 16, wherein said substrate is steel, alumina or fiberglass.

23. A composite layer for lining a substrate according to claim 17, wherein said substrate is steel.

24. A composite layer for lining a substrate according to claim 19, wherein said substrate is steel.

25. A composite layer, comprising:

at least one layer of a rubber material, said rubber material selected from the class consisting of natural rubber, a homopolymer, and a copolymer; said homopolymer made from monomers selected from the class consisting of dienes having from 4 to 12 carbon atoms; said copolymer made from monomers selected from the class consisting of dienes having from 4 to 12 carbon atoms and vinyl substituted aromatic compounds having from 8 to 12 carbon atoms, and from combinations of diene monomers having from 4 to 12 carbon atoms;

at least one layer of a first bonding layer bonded to said rubber layer, said first bonding layer containing a blend having from 5 to 25 percent by weight of a chlorinated polyethylene and from 25 to 75 percent by weight of an elastomer selected from the class consisting of natural rubber, a homopolymer, and a copolymer; said homopolymer made from monomers selected from the class consisting of dienes having from 4 to 12 carbon atoms; said copolymer made from monomers selected from the class consisting of dienes having from 4 to 12 carbon atoms and vinyl substituted aromatic compounds having from 8 to 12 carbon atoms, and from combinations of diene monomers having from 4 to 12 carbon atoms;

at least one layer of a second bonding layer bonded to said first bonding layer, said second bonding layer containing a blend having from 90 to 55 percent by weight of a chlorinated polyethylene and from 10 to 45 percent by weight of an elastomer selected from the class consisting of natural rubber, a homopolymer, and a copolymer; said homopolymer made from monomers selected from the class consisting of dienes having from 4 to 12 carbon atoms; said copolymer made from monomers selected from the class consisting of dienes having from 4 to 12 carbon atoms and vinyl substituted aromatic compounds having from 8 to 12 carbon atoms, and from combinations of diene monomers having from 4 to 12 carbon atoms; and at least one chlorinated polyethylene layer bonded to said second bonding layer so that said chlorinated polyethylene layer is bonded to said rubber layer through said bonding layers.

26. A composite layer according to claim 25, wherein the amount of said chlorine by weight of said chlorinated polyethylene in both said first and said second blend layers, and said chlorinated polyethylene layer ranges from about 25 to about 55 percent.

27. A composite layer according to claim 26, wherein said rubber in said polymer layer is selected from the class consisting of natural rubber, cis-1,3-polyisoprene, polyisoprene, polybutadiene, and a copolymer of styrene and butadiene;

said elastomer in both said first and said second blends is selected from the class consisting of natural rubber, polybutadiene, and a copolymer of butadiene and styrene.

28. A composite layer according to claim 26, wherein said rubbrer layer has a minimum thickness of 10 mills, wherein both said first and said second blend layers have a minimum thickness of 10 mills, and wherein said chlorinated polyethylene layer has a minimum thickness of 10 mills.

29. A composite layer according to claim 26, wherein said rubber layer, both said first and said second blend layers, and said chlorinated polyethylene layers have been cured.

30. A composite layer according to claim 26, wherein the number average molecular weight of said chlorinated polyethylene polymer in both said first blend and said second blend ranges from about 45,000 to about 150,000; the number average molecular weight of said chlorinated polyethylene in said chlorinated polyethylene layer ranges from about 45,000 to about 150,000 percent by weight; the number average molecular weight of said elastomer in said elastomer layer ranges from about 10,000 to about 500,000; and the number average molecular weight of said elastomer in both said first and second blend layers ranges from about 10,000 to about 500,000.

31. A composite layer according to claim 26, wherein the amount of said chlorine by weight of said chlorinated polyethylene in both said first and said second blend layers ranges from about 30 to about 40 percent; the amount of chlorine by weight in said chlorinated polyethylene layer based upon the chlorinated polyethylene polymer ranges from about 30 to about 40 percent; the number average molecular weight of said chlorinated polyethylene polymers in both said first blend and said second blend ranges from about 50,000 to about 100,000; the number average molecular weight of said chlorinated polyethylene in said chlorinated polyethylene layer ranges from about 50,000 to about 100,000 by weight;

the number average molecular weight of said rubber in said rubber layer ranges from about 100,000 to about 400,000; and the number average molecular weight of said rubber polymer in both said first and second blend layers ranges from about 100,000 to about 400,000.

32. A composite layer according to claim 31, wherein said rubber in said polymer layer is selected from the class consisting of natural rubber, cis-1,3-polyisoprene, polyisoprene, polybutadiene, and a copolymer of styrene and butadiene; and said elastomer in both said first and said second blend layers is selected from the class consisting of natural rubber, polybutadiene, and a copolymer of butadiene and styrene.

33. A composite layer according to claim 31, wherein the minimum thickness of said rubber layer is 30 mills, the minimum thickness of both said first blend and said second blend layers is 30 mills, and the minimum thickness of said chlorinated polyethylene layer is 30 mills.

34. A composite layer according to claim 31, wherein said rubber layer, both said first and said second blend layers, and said chlorinated polyethylene layers have been cured.

* * * * *